United States Patent [19]

Burkhart

[11] 4,178,699

[45] Dec. 18, 1979

[54] SOLAR ENERGY TEACHING AID

[76] Inventor: Carol A. Burkhart, Rte. 29, R.D. #1, St. Johnsville, N.Y. 13452

[21] Appl. No.: 922,325

[22] Filed: Jul. 6, 1978

[51] Int. Cl.² .............................................. G09B 25/00
[52] U.S. Cl. .......................................... 35/10; 35/49; 126/429; 237/1 A
[58] Field of Search .................... 35/10, 49, 50, 51, 13, 35/16; 126/270; 237/1 A

[56] References Cited

U.S. PATENT DOCUMENTS

| | | | |
|---|---|---|---|
| 1,594,673 | 8/1926 | Kreutzer et al. | 35/16 |
| 2,296,815 | 9/1942 | Evans | 35/50 X |
| 4,029,258 | 6/1977 | Groth | 237/1 A |
| 4,060,916 | 12/1977 | Finigan et al. | 35/10 |
| 4,135,491 | 1/1979 | Koizumi et al. | 273/1 A X |

Primary Examiner—William H. Grieb

[57] ABSTRACT

Discloses a solar energy teaching aid for use in instruction and experimentation to demonstrate the effects and results of active and passive home heating through solar energy. The teaching aid is in the form of a home, one of whose roofs has the largest surface area of any of the surface areas of such home. Such roof has transparent means allowing solar energy to pass therethrough for same to be absorbed by heat sinks, converted to heat energy and stored by such heat sinks, to demonstrate thereby passive collection; and such roof mounts an active collector whose absorber plate absorbs solar energy which is converted into heat energy that heats the internal air in such active collector, to demonstrate thereby active collection.

10 Claims, 3 Drawing Figures

SOLAR ENERGY TEACHING AID

BRIEF SUMMARY OF THE INVENTION

This invention relates to the field of teaching aids and educational devices. The object of this invention is to provide a teaching aid for use in instruction and experimentation to demonstrate the effects and results of active and passive home heating through solar energy. The teaching aid is in the form of a home, one of whose roofs has the largest surface area; such roof has transparent means to allow solar energy to pass therethrough for same to be absorbed by heat sinks, converted to heat energy and stored by such heat sinks, to demonstrate the effects and results of passive home heating; and such roof mounts an active collector whose absorber plate absorbs solar energy which is converted into heat energy that heats the interior air in such active collector, to demonstrate thereby the effects and results of active home heating.

BRIEF DESCRIPTION OF THE DRAWING

This object and other objects of the invention should be discerned and appreciated by reference to the detailed description taken in conjunction with the drawing, wherein like reference numerals refer to similar parts throughout the several views, in which.

DETAILED DESCRIPTION

Three criteria for utilizing solar energy in home heating are (1) to collect the heat, (2) to store such heat collected and (3) to distribute such stored heat.

Figure 1:
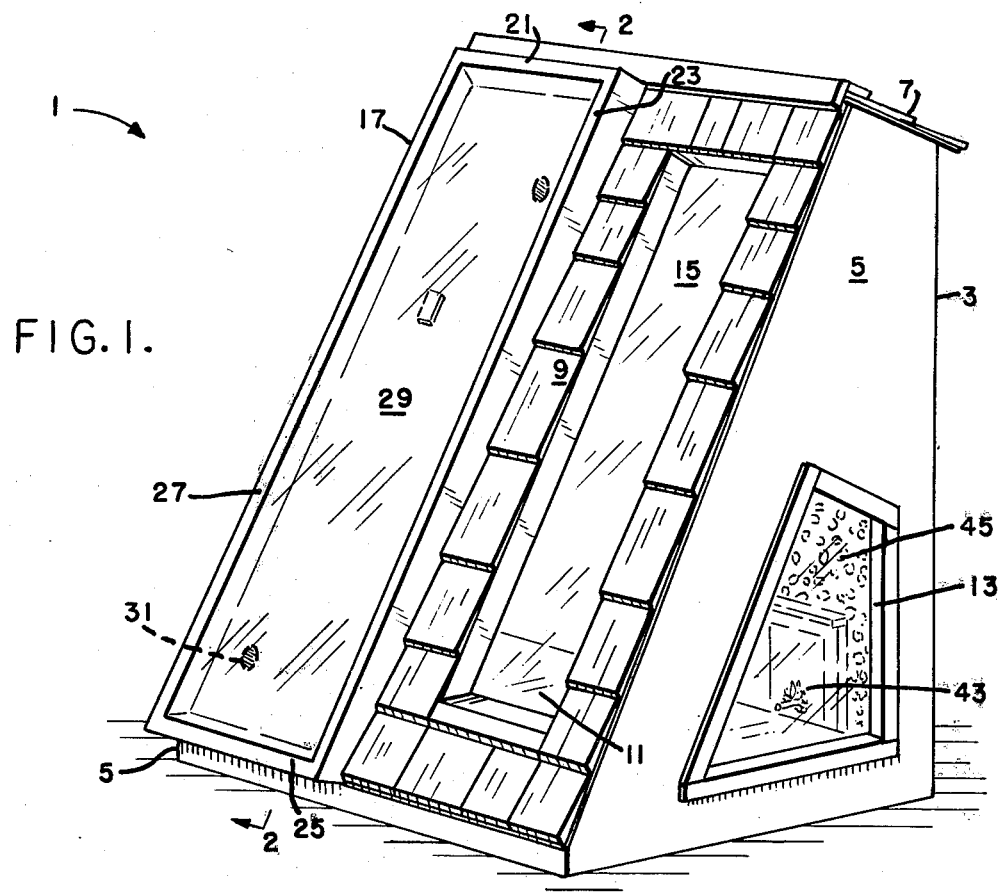
FIG. 1 is a perspective view of the invention.

In FIG. 1 of the drawings, reference numeral 1 generally refers to the solar energy teaching aid or home 1 comprising a vertical rear wall 3, left and right vertical side walls 5, roofs 7 and 9, and floor 11. Other than as indicated and described herein, home 1 is completely insulated by using conventional insulating material (not shown) for maximum heat retention and thermal resistivity. Right vertical wall 5 has an access window 13 for purposes of viewing the interior of home 1.

Roof 7 is shingled and angled, as shown. Part of roof 9 is shingled, as shown. Roof 9 has in coplanar relationship therewith a transparent means 15 such as a double-glazed or thermopane type window. Roof 9 carries on its exterior surface in suitably mounted parallel relationship therewith an active collector 17, all as shown.

Active collector 17 is in the configuration of a rectangular-shaped and shallow box-like structure comprising a black absorber plate 19 and sides 21, 23, 25 and 27 upstanding therefrom that are closed by glazing or suitable transparent medium 29. The active collector 17 communicates with the interior of home 1 by means of input hole 31 and output hole 33, as shown. Suitably mounted in operative relationship with output hole 33 is a blower 35 (such as the type advertised as catalog number TM21K378 in volume 44, number 1, of the 1978 catalog of Herbach & Rademan, Inc., 410 East Erie Avenue, Philadelphia, Pa. 19134).

Figures 2, 3:
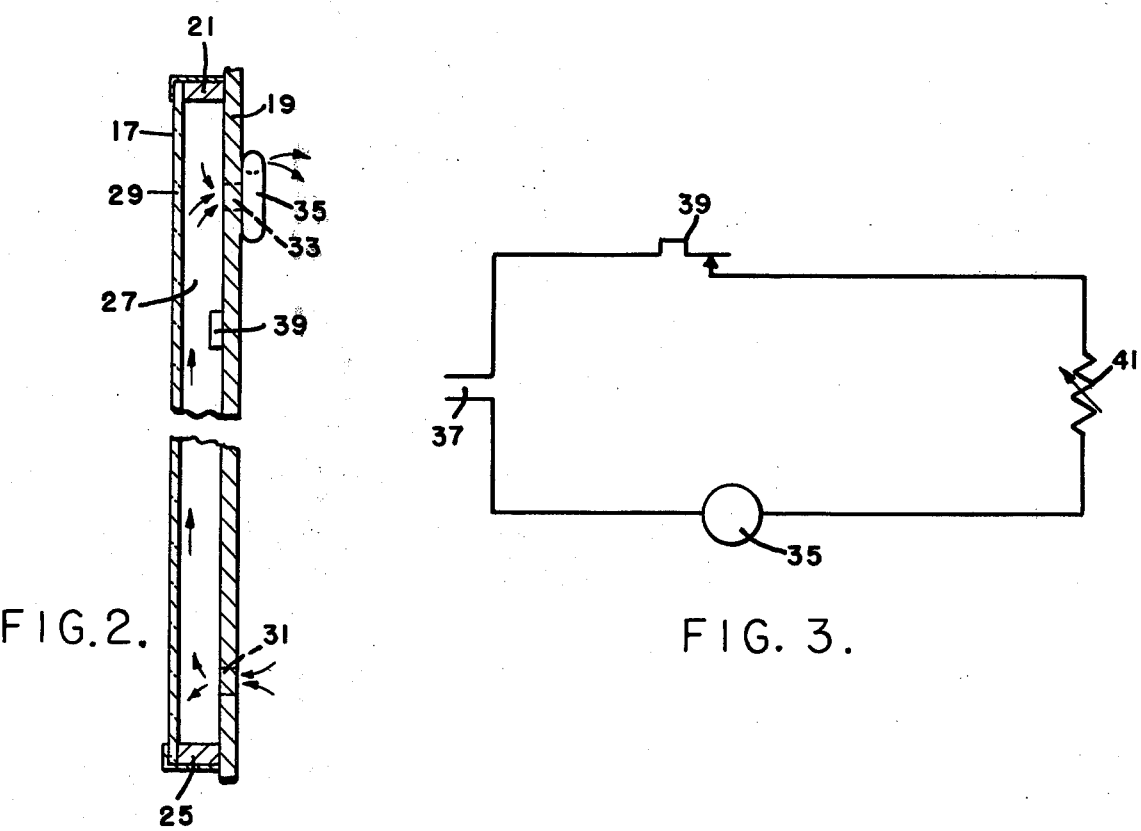
FIG. 2 is a view taken in the direction of the arrows 2—2 in FIG. 1.
FIG. 3 is the electrical diagram for the blower and controls utilized in the invention.

FIG. 3 shows the electrical diagram for the blower 35 wired to a power source 37 and controlled by a series-wired, heat-sensing switch 39 having an adjustable operating temperature range at which such switch closes and opens (such as the type of switch advertised as catalog number Q5329 in such Herbach & Rademan catalog, supra) and a suitable, conventional rheostat 41, series-wired, to adjustably control the velocity at which blower 35 operates. Heat-sensing switch 39 is disposed and located at approximately two-thirds of the vertical distance of active collector 17 from floor 11 and centrally of active collector 17 at such location.

Shown in the interior of teaching aid 1 are floor 11 of slate material and fireplace 43 with stone facing and other dark masonry facing 45 extending the full height of vertical rear wall 3.

Active solar energy is energy from the sun which passes through the glazing or suitable transparent medium 29 of the active collector 17 and strikes the surface of the black absorber plate 19 where such solar energy is absorbed, and such solar energy is converted into heat energy and the internal air in the active collector 17 is heated. Upon operation of the blower 35, such heated internal air in active collector 17 is drawn through output hole 33 of the active collector 17 into the interior of the home 1 and simultaneously cooler air will be drawn from the interior of home 1 in the region of floor 11 through input hole 31 into active collector 17 where such cooler air passing over the absorber plate 19 will be warmed and heated. The flow arrows in FIG. 2 show the movement of air from the interior of home 1 through the input hole 31, then upwardly through the interior of active collector 17 and then outwardly from active collector 17 through its output hole 33 into and warming the interior of home 1.

The temperature of the air in active collector 17 will depend upon the ambient temperature or the temperature of the environment surrounding home 1 and its active collector 17, the insolation or amount of incoming radiation or solar energy, the amount of such insolation absorbed by the absorber plate 19, the temperature of the cooler air entering the active collector 17 through its input hole 31, the operating temperature range at which heat-sensing switch 39 is adjusted to open and close the blower circuit and the velocity at which the blower 35 operates by preset adjustment of rheostat 41.

Hence, the active collector 17 has a critical low temperature below which the heat-sensing switch 39 opens the blower circuit to allow the active collector 17 to warm up and heat the air therein, or, as would be the case in the nightime, to suspend the transfer of heated air from output hole 33 to the interior of home 1.

To monitor the temperatures in the interiors of both the home 1 and its active collector 17, conventional temperature probes (not shown) are suitably inserted through holes (not shown) in home 1 and its active collector 17.

By reference to and reading of such monitoring temperature probes, by discrete adjustment of the heat-sensing switch 39 to turn the blower 35 on and off responsive to a discrete temperature range, and by discrete adjustment of rheostat to constrain blower 35 to operate at a certain velocity, students will be afforded the opportunity and means to experimentally determine the ideal temperature range within which active collector 17 should be constrained to operate for maximum efficiency for purposes of active home heating.

To demonstrate the aspects of passive solar heating, the teaching aid or home 1 of this invention has been designed to be its own collector through cooperation of the transparent means 15 in roof 9 which allows solar energy to pass therethrough for passive collection by the slate floor 11 functioning as a heat sink to absorb such solar energy, converting same to heat energy and storing same. The fireplace's stone facing and other dark masonry facing 45 similarly functions as a heat sink. Circulating air in the home interior is warmed by surface contact with such heat sinks.

Roof 9, including transparent means 15 and active collector 17, has and must have the largest surface area of any of the surface areas of teaching aid 1 in order that transparent means 15 and active collector 17 similarly will have large exposed surface areas upon which the sun can shine for reason of the fact that the greater the size of transparent means 15, greater will be the passive heat energy stored by the heat sinks; and for reason of the fact that the greater the size of the black absorber plate 19 of active collector 17, greater will be the active solar energy absorbed by absorber plate 19.

In utilizing teaching aid 1, roof 9 must be disposed to face South for exposure to winter sunlight. The angle of inclination of roof 9 is critical and such angle depends upon the latitude in which teaching aid 1 is utilized. For example, in the Northern hemisphere at 42 degrees of latitude, roof 9 must be inclined with the horizon at an angle ranging between 50 to 60 degrees in order that roof 9 and hence transparent means 15 and active collector 17 substantially will have maximum exposure to winter sunlight in that both transparent means 15 and active collector 17 will be disposed substantially perpendicular to the sun's rays.

To demonstrate the effects and results of active home heating only, the transparent means 15 would be suitably covered or otherwise isolated from functioning in order that no solar energy would be admitted through transparent means 15 to be absorbed by such heat sinks, converted into heat energy and stored, thereby permitting the effects and results of active home heating only to be demonstrated, monitored and determined by reference to and reading of the temperature probes disposed both in the interior of the home 1 and active collector 17. To demonstrate the effects and results of passive home heating only, the active collector 17 would be suitably covered or otherwise isolated from functioning and the blower 35 would be appropriately disconnected and rendered inoperative in order that no heat would be admitted to the interior of home 1 from the active collector 17, thereby permitting the effects and results of passive home heating only to be demonstrated, monitored and determined by reference to and reading of the temperature probe disposed in the interior of home 1. To demonstrate the effects and results of both active and passive home heating, both the transparent means 15 and its associated heat sinks would be allowed to freely operate, as described, and active collector 17 similarly would be allowed to freely operate, thereby permitting the effects and results of both active and passive home heating to be demonstrated, monitorred and determined by reference to and reading of the temperature probes disposed both in the interior of home 1 and active collector 17.

Having thusly described my invention, I claim:

1. A solar energy teaching aid for use in instruction and experimentation to demonstrate the effects and results of active and passive home heating through solar energy, said teaching aid being in the form of a miniature home unattached to the ground and comprising a rear wall, side walls, angled roofs and a floor representing discrete surface areas with one of said roofs having the largest surface area: such roof mounting an active collector to absorb solar energy and convert same to heat energy, said active collector having means for communicating with the interior of such home to permit the movement of cooler air from such home through said active collector, for the heating of such cooler air in said active collector and the discharge of such active-collector heated air into the interior of such home, to thereby demonstrate active home heating; and such roof having a transparent means, said home having heat sink means to passively absorb solar energy, convert same to heat energy and store same, said transparent means and heat sink means cooperating to demonstrate such passive home heating by said transparent means allowing solar energy to pass therethrough to said heat sink means where such solar energy is absorbed, converted to heat energy and stored.

2. A solar energy teaching aid in accordance with claim 1, wherein such roof having the largest surface area has an angle of inclination such that such roof will be disposed substantially perpendicular to the sun's rays.

3. A solar energy teaching aid in accordance with claim 1, wherein said active collector is mounted in parallel relationship on such roof having the largest surface area and said transparent means is in coplanar relationship with such roof.

4. A solar energy teaching aid in accordance with claim 1, wherein said active collector is in the configuration of a shallow box-like structure, wherein said active collector has an absorber plate, sides and transparent medium, wherein said sides are upstanding from said absorber plate and wherein said transparent medium closes said sides.

5. A solar energy teaching aid in accordance with claim 1, wherein said means said active collector has for communicating with the interior of such home comprises input and output holes.

6. A solar energy teaching aid in accordance with claim 5, wherein is further provided blower means, wherein said blower means is disposed in operative relationship with said output hole to effect the discharge of such active-collector heated air into the interior of such home.

7. A solar energy teaching aid in accordance with claim 6, wherein are further provided a heat-sensing switch and a rheostat, wherein said heat-sensing switch controls the on-and-off operation of said blower means within an adjustable temperature range and wherein said rheostat controls the velocity of said blower means.

8. A solar energy teaching aid in accordance with claim 2, wherein said active collector is mounted in parallel relationship on such roof having the largest surface area and said transparent means is in coplanar relationship with such roof.

9. A solar energy teaching aid in accordance with claim 4, wherein said means said active collector has for communicating with the interior of such home comprises input and output holes, wherein is further provided blower means, wherein said blower means is disposed in operative relationship with said output hole to effect the discharge of such active-collector heated air into the interior of such home.

10. A solar energy teaching aid in accordance with claim 9, wherein are further provided a heat-sensing switch and a rheostat, wherein said heat-sensing switch controls the on-and-off operation of said blower means within an adjustable temperature range and wherein said rheostat controls the velocity of said blower means.

* * * * *